Patented Feb. 16, 1926.

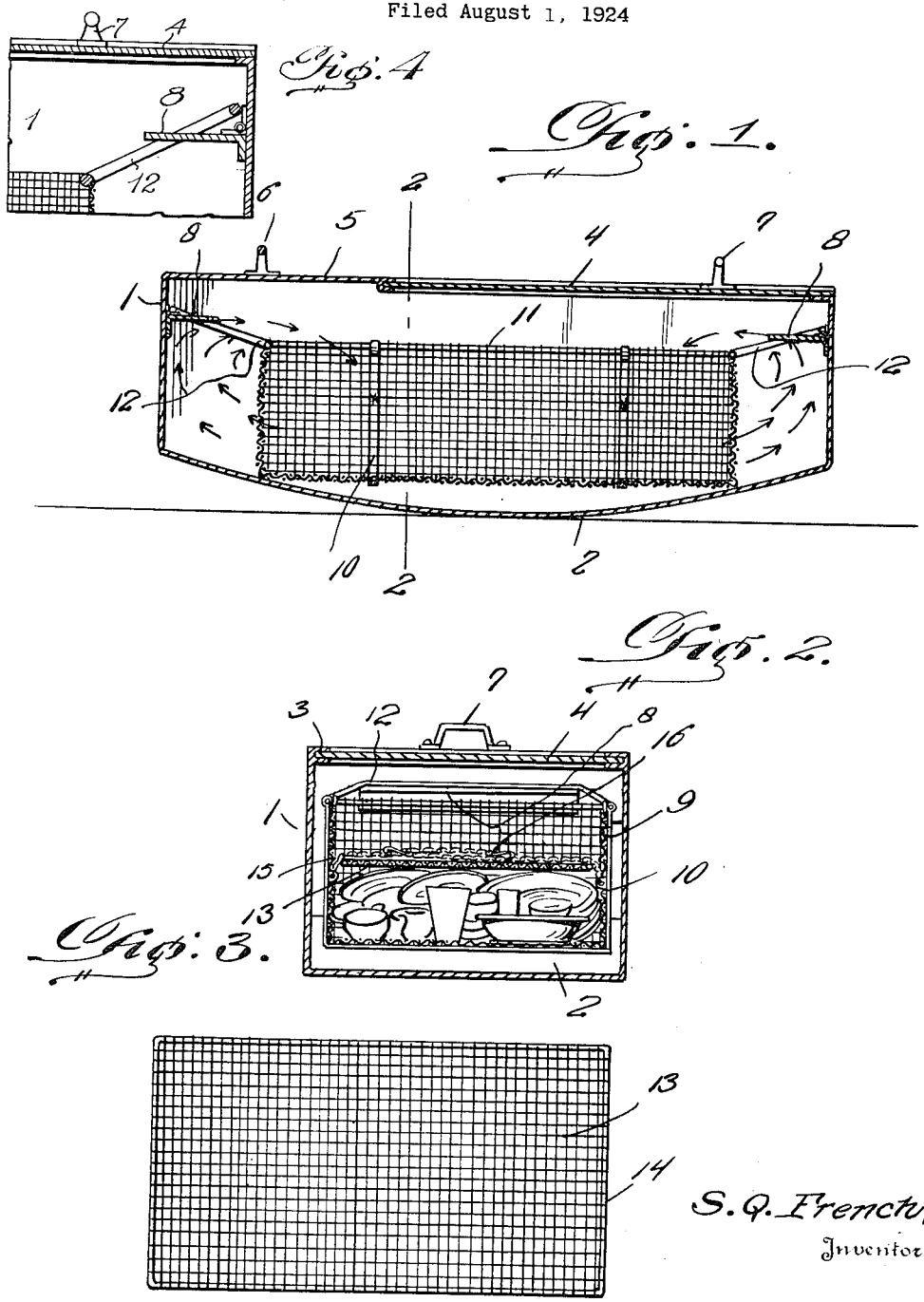

1,573,387

UNITED STATES PATENT OFFICE.

SHERMAN Q. FRENCH, OF HAWARDEN, IOWA.

DISHWASHER.

Application filed August 1, 1924. Serial No. 729,526.

*To all whom it may concern:*

Be it known that I, SHERMAN Q. FRENCH, a citizen of the United States, residing at Hawarden, in the county of Sioux and State of Iowa, have invented certain new and useful Improvements in a Dishwasher, of which the following is a specification.

This invention relates to new and useful improvements in dish washing machines and has for its principal object to provide a machine which will efficiently and easily enable dishes to be thoroughly washed and cleaned.

One of the important objects of the present invention is to provide a dish washer wherein the tank is of such a construction as to cause the hot water therein to thoroughly come in contact with the dishes placed in a wire basket or receptacle within the tank, water deflecting baffles being arranged in the tank above the basket to assist in circulating the water through the latter.

A further object of the invention is to provide a dish washer which when in operation will maintain a rocking motion so that the water in the tank will be caused to splash over the dishes in the receptacle in the tank and thoroughly clean the same.

A further object is to provide a dish washer of the above mentioned character, wherein means is associated with the dish receptacle for limiting the movement of the dishes therein when the receptacle is in the water tank.

A still further object is to provide a dish washer of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a longitudinal sectional view of my improved dish washer.

Figure 2 is a transverse section taken approximately on line 2—2 of Figure 1.

Figure 3 is a top plan view of the removable cover associated with the dish receptacle.

Fig. 4 is a sectional detail view showing the connection of the baffles to the tank.

In the drawing wherein for the purpose of illustration is shown the preferred embodiment of my invention, the numeral 1 designates the rocker tank of my improved dish washer, the same being substantially rectangular in design. The bottom of the tank is substantially concaved as illustrated at 2 to facilitate the rocking motion of the tank in the manner hereinafter to be more fully described. The top of the tank has its major portion open and the opposite sides of the tank adjacent the upper edges of the open portion have the longitudinally extending grooves 3 provided therein whereby the removable cover 4 which closes the opening in the top of the tank is adapted for slidable movement within the grooves. The remaining portion of the top of the tank is closed as illustrated at 5. Suitable handles such as are shown at 6 and 7 are associated with the portion 5 of the top of the tank 1 and the removable cover 4 respectively whereby the tank may be rocked.

Arranged on the inside of the tank on the ends thereof adjacent the top of the tank are pivotally mounted water deflecting baffles 8. These baffles are limited in any appropriate manner to upward swinging movement. Normally, they occupy the horizontal positions shown. The purpose of the baffles will also hereinafter be more fully described.

Adapted to be placed in the tank 1 is the substantially rectangular shaped dish receptacle 9, the same being preferably constructed of fine mesh wire whereby the same is rendered reticular on all its sides. The perforate dish receptacle is of such size as to be spaced from the ends and sides of the tank and will rest on the concaved bottom 2 of the tank in the manner clearly illustrated in the drawing. Extending around the bottom and the opposite sides of the dish receptacle 9 are the metallic straps 10, the upper ends of which are looped for receiving the reinforcing wire 11 which extends around the upper edges of the receptacle. Handles such as are illustrated at 12 are associated with the ends of the reinforcing wire 11 to facilitate the handling of the dish receptacle in inserting and removing the same from the tank.

The dishes to be washed and cleaned are placed in the receptacle 9 and for the purpose of preventing the dishes freely moving in the receptacle so as to prevent the breakage of the dishes, a removable cover 13 which is formed of the same material as the dish receptacle having its edges reinforced with the wire 14 is placed in the dish receptacle on top of the dishes and is held in position therein through the medium of the chains 15, the ends of which are fastened to the upstanding portions of the metallic strips 10.

The free ends of the chains are provided with hooks such as are shown at 16 for engagement with the links in the chain, the hook on one end of each chain being engaged with the links of the other chain. This construction is clearly illustrated in Figure 2 of the drawing. Not only does the removable cover 13 provide a means for preventing the dishes from moving around in the receptacle but also provides a means whereby a partition is provided so that more than one layer of dishes may be placed in the receptacle as is desired and yet permit the hot water in the tank to come in contact with all of the dishes in the perforate receptacle.

By standing the tank 1 on one of its ends, it being understood of course that the dish receptacle is removed therefrom at the time the tank may be filled with water and placed on a stove or the like whereby the water may be heated. After the water has become hot, the tank 1 is placed in a substantially horizontal position and the dish receptacle with the dishes therein placed in the tank by removing the slidable cover 4. The cover 4 is then placed in position on the open portion of the tank so that there will be no possibility of any water in the tank being discharged therefrom. By actuating the handles 6 and 7, the tank 1 will be caused to rock due to the shape of the base or bottom thereof and as the tank rocks, the water therein will be caused to whirl and strike the baffle plates whereby the water will be deflected on the dish receptacle and cause the dishes therein to be thoroughly washed and cleaned. After the dishes have been thoroughly washed, the receptacle is removed from the tank and placed upon a drain board or the like whereby the water will drain off the dishes and permit the dishes to become dry, thus obviating the necessity of having to wipe the same.

The provision of the deflecting baffles will insure the proper circulation of the water in the tank so that the dishes in the receptacle will be thoroughly washed and furthermore the pivoted baffles will facilitate cleaning and insertion and removal of the wire basket or receptacle.

For the purpose of preventing the longitudinal movement of the dish receptacle 9, the rigid handles 12 rest upon the respective baffles and have their bight portions engaged with the respective end walls of the tank.

While I have shown the preferred embodiment of my invention, it is to be understood that various changes in the size, shape, and arrangement of parts may be resorted to without departing from the spirit of the invention and the scope of the appended claim.

Having thus described the invention, what I claim is:—

A dish washing apparatus comprising a substantially rectangular elongated tank having a longitudinally curved flat bottom forming a rocking surface, said tank being provided in its top wall and adjacent one end with a comparatively large opening, a slide cover for said opening, a substantially oblong wire dish containing basket insertable and removable through said opening in the tank, said basket being open at its top, a pair of U-shaped handles fastened rigidly to the ends of the basket, means for confining the dishes within said basket, and a pair of pivotally mounted upwardly swinging baffle plates carried by the opposite end walls of said tank, said plates being normally disposed in a horizontal plane above the top of said basket, and the aforesaid handles resting upon said baffle plates, with their bight portions engaging the end walls of the tanks to prevent endwise movement of the basket within the latter.

In testimony whereof I affix my signature.

S. Q. FRENCH.